United States Patent [19]

Diethelm et al.

[11] Patent Number: 4,463,147

[45] Date of Patent: Jul. 31, 1984

[54] HEAT-CURABLE MIXTURES, STABLE ON STORAGE, BASED ON POLYIMIDES AND CONTAINING POLYMERIZATION CATALYSTS

[75] Inventors: Hermann Diethelm, Aesch; Abdul-Cader Zahir, Oberwil, both of Switzerland

[73] Assignee: Ciba-Geigy Corporation, Ardsley, N.Y.

[21] Appl. No.: 449,023

[22] Filed: Dec. 13, 1982

[30] Foreign Application Priority Data

Dec. 23, 1981 [CH] Switzerland ................. 8253/81

[51] Int. Cl.³ .............................................. C08F 22/40
[52] U.S. Cl. .................................... 526/262; 525/502; 526/89; 526/210; 526/261; 526/273; 526/274; 526/276; 526/278; 526/313; 528/322
[58] Field of Search ............... 526/262, 261, 313, 210, 526/89, 278, 276, 274, 273; 525/502

[56] References Cited

U.S. PATENT DOCUMENTS

| | | | |
|---|---|---|---|
| 3,313,863 | 4/1967 | Schnell et al. | 260/864 |
| 3,726,837 | 4/1973 | de Jongh et al. | 260/77.5 |
| 4,127,615 | 11/1978 | Zahir et al. | |

FOREIGN PATENT DOCUMENTS

| | | |
|---|---|---|
| 1041614 | 9/1966 | United Kingdom . |
| 1041040 | 9/1966 | United Kingdom . |
| 1355401 | 6/1974 | United Kingdom . |
| 1568720 | 6/1980 | United Kingdom . |

*Primary Examiner*—Harold D. Anderson
*Attorney, Agent, or Firm*—Luther A. R. Hall

[57] ABSTRACT

A mixture consisting of a polymaleimide and a copolymerizable monomer or a prepolymer formed from these two compounds contains, as the polymerization catalyst, an ethane which is substituted by aromatic groups and hydroxyl groups or halogen (cf. formula II), such as benzpinacol. The mixture is stable on storage and heat-curable. It can be cured, while at the same time being shaped to give mouldings, sheet-like structures, laminates, adhesive bonds or foams, for example by casting or compression moulding.

18 Claims, No Drawings

HEAT-CURABLE MIXTURES, STABLE ON STORAGE, BASED ON POLYIMIDES AND CONTAINING POLYMERIZATION CATALYSTS

The invention relates to a heat-curable mixture which is stable on storage and contains a polymaleimide and a polymerisation catalyst, and to a process for the preparation of cured polymers.

Organic peroxides, for example percarbonates, diacyl peroxides, per-esters, per-acids or ketone hydroperoxides, are used to a great extent as initiators for free-radical polymerisation. When warmed to a specific temperature, they decompose exothermically into free radicals with a half-life period which is characteristic for each peroxide. In the presence of polymerisable double bonds, these free radicals add themselves on thereto and initiate the polymerisation.

The addition of cobalt or vanadium salts of an amine or mercaptan accelerates the decomposition of the peroxide and the curing reaction. In addition, there are also inhibitors, such as phenols or aromatic amines, which greatly delay curing or render it impossible.

A new group of initiators which, in contrast with peroxides, raises no problems of safety in operation and, in contrast with azo compounds, does not liberate any readily volatile substances, is described, for curing polyesters in a thermosetting manner, in German Ausleges-chrift 1,219,224, namely ethanes which are polysubstituted in the 1-position and 2-position and which form C-radicals, for example benzpinacone or —more correctly—benzpinacol.

German Offelegungsschrift 2,033,910 describes similar C-C free-radical formers, namely 1,2-diaryl-1,2-dicyanoethane.

It has now been found that these initiators exert a similar catalytic effect when polymaleimides are cured together with polymerisation partners. This behaviour would not have been expected; on the contrary, it would have been expected that such catalysts would be deactivated by phenolic hydroxyl groups or by reactants containing free amino groups.

The invention relates, therefore, to a heat-curable mixture, stable on storage and based on a polyimide and a polymerisation catalysts, which contains (a) a polymaleimide of the formula I

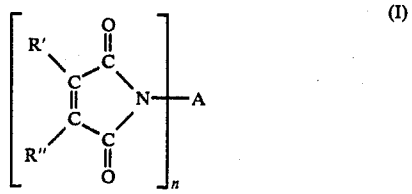

in which R' and R" are a hydrogen atom or a linear or branched alkyl group having 1 to 4 C atoms and A is a divalent, trivalent or tetravalent aliphatic radical having 2 to 30 C atoms, a cycloaliphatic radical, an aromatic radical, a heterocyclic radical or an araliphatic radical and n is 2, 3 or 4, or , if n is 2, A is also a direct bond, (b) either a component which undergoes an addition or polymerisation reaction with the maleic double bond or a still fusible prepolymer of such a component with (a), and also (c) in an amount of 0.1 to 10% by weight, based on the sum of the amounts of (a), (b) and (c), a polymersation catalyst of the formula II

in which $R_1$ and $R_3$ are each an aromatic radical, $R_2$ is a hydrogen atom or an aliphatic or aromatic radical, $R_4$ is an aliphatic or aromatic radical and X and Y, independently of one another, are each a free or masked hydroxyl group or a halogen atom, and (d) if appropriate, additives which are customary in the technology of curable plastics.

R' or R" is preferably hydrogen; compounds of the formula I which are particularly preferred are those in which both R' and R" are hydrogen.

A in the formula I is preferably an unsubstituted or methyl-substituted phenylene or biphenylene group, a diphenyl ether group, a diphenyl sulfone group, a 2,2-diphenylpropane group or a diphenylmethane group and n is 2.

The following imides are particularly suitable: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-(3,3'-dichloro)-diphenylmethane-bis-maleimide, N,N'-4,4'-diphenylethane-bis-maleimide, N,N'-4,4'-diphenylsulfone-bis-maleimide, N,N'-m-xylylene-bis-maleimide, N,N'-p-xylylene-bis-maleimide, N,N'-4,4'-(2,2-diphenylpropane)bis-maleimide, the N,N'-bis-maleimide of 4,4'-diaminotriphenyl phosphate, the N,N'-bis-maleimide of 4,4'-diaminotriphenyl phosphite, the N,N'-bis-maleimide of 4,4'-diaminotriphenyl thiophosphate, the N,N',N"-tris-maleimide of tris-(4-aminophenyl) phosphate, the N,N',N"-tris-maleimide of tris-(4-aminophenyl) phosphite and the N,N',N"-tris-maleimide of tris-(4-aminophenyl) thiophosphate.

The mixture can also contain more than one polymaleimide of this type.

A compound having at least 2 functional groups of the same or different types, such as hydroxyl groups, amino groups or olefinic groups, is particularly suitable as component (b).

Preferred mixtures are those containing, as the component (b), compounds which have at least one olefinic double bond in the molecule, in particular a vinyl or allyl compound, such as a triallyl cyanurate or triallyl isocyanurate, or an alkenylphenol or alkenylphenol ether, such as a phenolic compound which is substituted by at least one allyl or propen-1-yl group.

Both mononuclear and polynuclear, preferably dinuclear, alkenylphenpols or alkenylphenol ethers can be employed. In this connection, preferably at least one nucleus contains both an alkenyl group and a phenolic OH group, which can be etherified.

The alkenylphenol compound is preferably present in the mixture according to the invention in such an amount that there are 0.1 to 10 olefinic double bonds of the component (b) to one maleimide double bond.

As is known, alkenylphenols are prepared by a thermal rearrangement (Claisen) of the alkenyl ethers of phenols (for example of the allyl ether of phenol). These alkenyl ethers are also obtained in accordance with known processes by reacting phenols and, for example, allyl chloride in the presence of an alkali metal hydroxide and solvents. As is known, condensation (elimination of alkali metal chloride) takes place.

A typical dinuclear alkenylphenol which can be employed in accordance with the invention is an alkenylphenol of the formula III

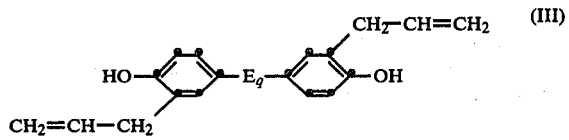

in which E is one of the radicals —$CH_2$—,

—$SO_2$—, —SO—, —S— and —O— and q is 0 or 1.

Good results are also obtained by using mixtures of polynuclear alkenylphenols and/or alkenylphenol ethers with mononuclear alkenylphenols and/or alkenylphenol ethers. Alkenylphenol ethers which are preferably employed are substances containing one or more —O—R molecular moieties, R being an alkyl radical having 1 to 10 C atoms, an aryl radical or an alkenyl radical, preferably allyl, methallyl or 1-propenyl, and the O atom constituting the phenolic ether bridge.

A further embodiment of the invention is constituted by the use of mixtures of substances containing only one OH group and only one alkenyl group on the aromatic nucleus, together with substances containing several OH groups and/or several alkenyl groups on the aromatic nucleus, or mixtures of the corresponding phenolic ethers of these substances.

The following are examples of alkenylphenols which can be present in the mixtures: o,o'-diallyl-bisphenol A, 4,4'-hydroxy-3,3'-allylbiphenyl, bis-(4-hydroxy-3-allylphenyl)-methane, 2,2-bis-(4-hydroxy-3,5-diallylphenyl)-propane and eugenol.

The corresponding methallyl compounds can also be used. The corresponding ethers of these phenols, in particular the methyl ethers, can also be employed instead of the said alkenylphenols.

Further alkenylphenols which can be used readily are the 1-propenyl-substituted phenols of the formula IV

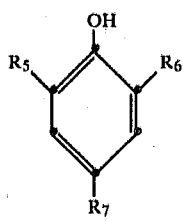

in which $R_5$, $R_6$ and $R_7$ are each a hydrogen atom or the allyl or propenyl group, at least one of the substituents $R_5$ to $R_7$ being the propen-1-yl group, of the formula V

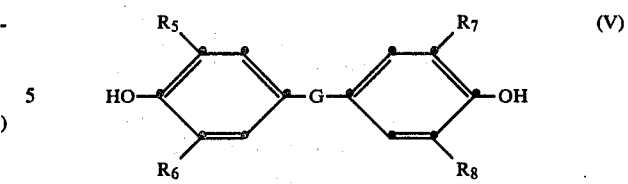

in which $R_5$, $R_6$, $R_7$ and $R_8$ are each a hydrogen atom or the allyl or propenyl group, at least one of the substituents $R_5$ to $R_8$ being the propen-1-yl group, and G is isopropylene, methylene, sulfonyl, —O— or —S—, or of the formula

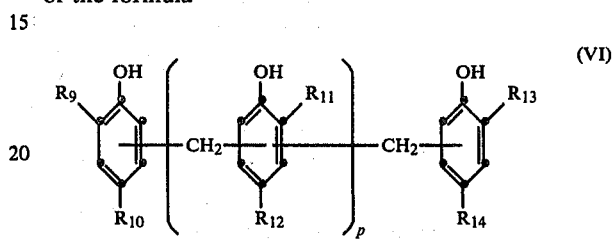

in which $R_9$, $R_{10}$, $R_{11}$, $R_{12}$, $R_{13}$ and $R_{14}$ are each a hydrogen atom, alkyl having 1 to 4 C atoms, allyl or propenyl, at least one of the substituents $R_9$ to $R_{14}$ being the propen-1-yl group, and p is a number from 0 to 10.

Components (b) of the mixture which are preferentially used are the propenyl-substituted phenols of the formula VI, in particular those in which, in the formula VI, $R_4$ and $R_6$ are each a propenyl group, $R^5$ and $R^7$ are each a hydrogen atom and X is isopropylene, methylene or —O—.

Suitable components (b) of the mixture are also the mixtures of isomers consisting of propenyl-substituted and allyl-substituted monohydric and polyhydric phenols, it being necessary for the proportion of isomeric propenyl groups in the mixture of isomers to be, preferably, at least 10 equivalents %, in particular at least 20 equivalents %, based on the sum of the equivalents of propenyl and allyl groups.

The propenyl-substituted phenols of the formula V are known and can be obtained in accordance with the process described in the "Journal of the American Chemical Society" (1956), pages 1,709 to 1,713, by isomerisation of the corresponding allyl-substituted phenols under alkaline conditions, by heating, for example, 2,6-diallylphenol in the presence of at least equal quantities of potassium hydroxide solution at over 100° C. until all the allyl groups have been isomerised to give propen-1-yl groups and the corresponding 2,6-dipropenylphenol has been formed. The effect of using less than an equivalent quantity of potassium hydroxide solution, of employing lower isomerisation temperatures or of discontinuing the isomerisation reaction is that the isomerisation takes place only partially and mixtures of isomers consisting of propenyl-substituted and allyl-substituted phenols are accordingly obtained. Mixtures of isomers can, of course, also be prepared by mixing pure propenylphenols with allylphenols.

The propenyl-substituted phenols of the formulae VI and VII have hitherto not yet been described in the literature and they can also be prepared by the alkaline isomerisation process mentioned above.

As is known, the allyl-substituted phenols employed as the starting compounds in the isomerisation process are obtained by etherifying the phenolic hydroxyl group with allyl chloride, followed by a Claisen rearrangement. The corresponding polyallylphenols are obtained by repeating this conversion and rearrangement reaction.

The propenyl-substituted dihydric phenols of the formulae VI and VII are resin-like compounds which, compared with the previously known 2,6-dipropenylphenol, can be processed more readily in mixtures with maleimides as moulding materials and powders for sintering. In addition, the new compounds have the advantage that they do not suffer from an unpleasant odour, which makes it difficult to work with the previously known 2,6-dipropenylphenol.

It is particularly advantageous if an epoxide compound containing at least one allyl group is present as the component (b) in the mixture according to the invention, if appropriate with the addition of a curing agent for epoxide resins. The mixture preferably contains an epoxide compound or a mixture of several epoxide compounds belonging to the series comprising (α) glycidyl ethers of the formula VII

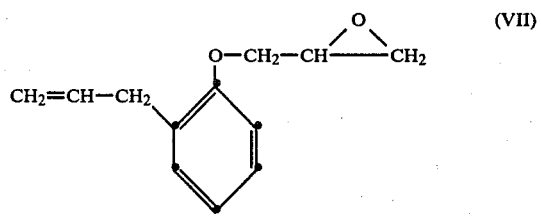
(VII)

(β) glycidyl ethers of novolaks containing at least one allyl group on at least one aromatic nucleus, (γ) polyepoxy adducts which have been prepared by an advancement reaction of one or more diepoxide compounds with one or more bisphenols, at least one reactant containing one or more allyl groups on at least one aromatic nucleus, and (δ) epoxide compounds which have been prepared by reacting, with epichlorohydrin in alkaline solution, bisphenols containing one or more allyl groups on at least one aromatic nucleus.

The constituents are preferably present in the mixtures according to the invention in a ratio such that there are 0.05 to 10, preferably 0.1 to 1.5, equivalents of epoxide and, if appropriate, 0.05 to 10, preferably 0.05 to 2, mols of curing agent to 1 equivalent of polymaleimide.

The glycidyl ethers of novolaks (β) which can be employed in the mixtures according to the invention are entirely in accordance with glycidyl ethers such as are described in the "Handbook of Epoxy Resins" by Henry Lee and Kris Neville (Mc Graw-Hill Book Comp., USA, 1967) under 2-10 to 12, the only difference being that they contain one or more allyl groups on the aromatic nucleui. Allylphenols are used entirely or partially in the preparation of the novolaks which are glycidylated.

The polyadducts δ which can be present in the mixtures according to the invention can also be obtained by the process described in the "Journal of Applied Polymer Science" 19 (1975), 585–600, and in "Kunststoff-Rundschau" 1959, pages 1–10. The mixtures according to the invention preferably contain polyepoxy adducts which have been prepared by an advancement reaction of a diglycidyl ether of the formula VIII

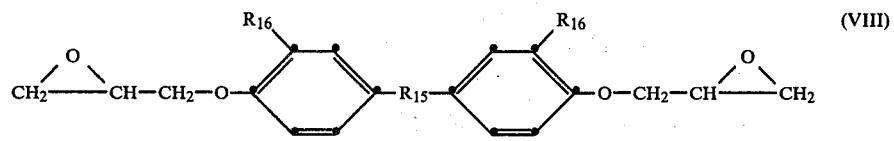
(VIII)

in which $R_{15}$ is one of the radicals —$CH_2$— and $$-\underset{\underset{CH_3}{|}}{\overset{\overset{CH_3}{|}}{C}}-$$

and $R_{16}$ is an alkyl group or H, with one or more of the bisphenols of the formulae IX or X:

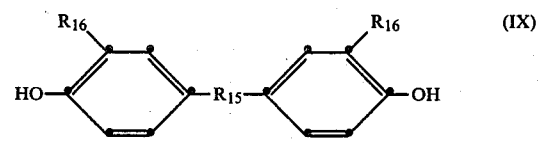
(IX)

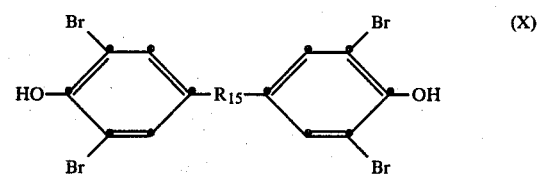
(X)

at least one starting substance containing at least one allyl group on the aromatic nucleus.

The epoxide compounds (δ) are, on the whole, in accordance with the fundamental epoxide resins formed from polyphenols and epichlorohydrin, such as are illustrated under 2—2 in the handbook mentioned above (see also Houben-Weyl "Methoden der Organischen Chemie" ("Methods of Organic Chemistry"), Stuttgart 1963, Volume 14, 2nd part, pages 468–470), the only difference being that, like the above novolac epoxide resins, they contain one or more allyl groups on aromatic nucleui. In preparing these epoxide compounds, the following bisphenols can be reacted with epichlorohydrin in alkaline solution: o,o'-diallyl-bisphenol A or o,o'-diallyl-bisphenol F.

Apart from the epoxide compounds containing allyl groups, the mixtures according to the invention can, additionally, also contain epoxide compounds which are free from allyl groups. Suitable examples of such products are conventional bisphenol A or bisphenol F epoxide resins and triglycidyl isocyanurate, epoxide compounds containing hydantoin nuclei, and the like.

Examples of curing agents for epoxide compounds which can be present in the mixtures according to the invention are polycarboxylic acids and their anhydrides and compounds containing amino groups. It is preferable to employ the anhydrides of organic acids, especially phthalic anhydride, and aliphatic or aromatic or mixed aromaticaliphatic amines, especially 4,4'-diaminodiphenylmethane and dicyandiamide.

As the component (b), the mixture according to the invention can also contain a compound of the formula XI $$Z—(NH_2)_m \quad (XI)$$

in which Z is an m-valent aliphatic, cycloaliphatic, aromatic, heterocyclic or araliphatic radical and m is a number from 2 to 4, for example an aromatic polyamine, such as a diamine. Preferred examples are m-phenylenediamine or p-phenylenediamine, 4,4'-diaminodiphenylmethane, 2,2-bis-(4-aminophenyl)-propane, 4,4'-diaminodiphenyl ether, 4,4'-diaminodiphenyl sulfone, m-xylylenediamine or p-xylylenediamine.

Further examples are 4,4'-diaminodicyclohexylmethane, 1,4-diaminocyclohexane, m-phenylenediamine, p-phenylenediamine, 4,4'-diaminodiphenylmethane, 2,2-bis-(4-aminophenyl)-propane, 4,4'-diaminodiphenyl ether, 4,4'-diaminodiphenyl sulfone, 1,5-diaminonaphthalene, m-xylylenediamine, p-xylylenediamine, ethylenediamine, hexamethylenediamine, bis-(γ-aminopropyl)-5,5-dimethylhydantoin and 4,4'-diaminotriphenyl phosphate, and also 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminobiphenyl, 3,4,6-triaminopyridine, 2,4,4'-triaminophenyl ether, 2,4,4'-triaminodiphenylmethane, 2,4,4'-triaminodiphenyl sulfone, 2,4,4'-triaminobenzophenone, 2,4,4'-triamino-3-methyldiphenylmethane, N,N,N-tri-(4-aminophenyl)-amine, tri-(4-aminophenyl)methane, tri-(4-aminophenyl) phosphate, tri-(4-aminophenyl) phosphite, tri-(4-aminophenyl) thiophosphate, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminophenyl ether, 3,3',4,4'-tetraaminodiphenylmethane, 3,3',4,4'-tetraaminodiphenyl sulfone and 3,4-bis-(3,4'-diaminophenyl)pyridine.

Further preferred components (b) are triazine resins, in particular the compound of the formula XII

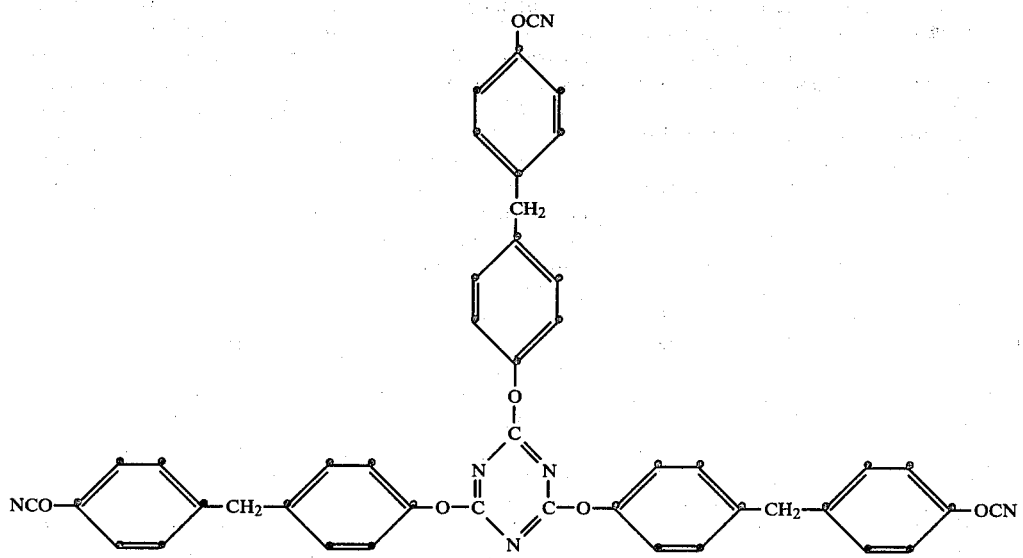

(XII)

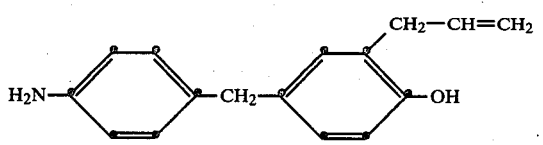

(XIII)

Acetoneanil (2,2,4-trimethyl-1-dihydroquinoline) can also be present with advantage as the component (b) in the mixture. This is a known compound, which can be prepared from acetone and aniline by the process described in "Organic Synthesis," Coll. Volume 3 [1955], page 329.

Maleimides and acetoneanil are preferably present in the mixtures according to the invention in a ratio such that there is 0.05 to 1 mol, preferably 0.1 to 0.5 mol, of acetoneanil to 1 equivalent of imide group.

Besides acetoneanil, the mixture can, in addition, also contain a copolymerisable compound containing at least one olefinic double bond.

Suitable compounds of this type are preferably vinyl polymers, such as styrene, α-methylstyrene, vinyl acetate, vinyl methacrylate or divinylbenzene, acrylates or methacrylates of alcohols or phenols, such as methyl acrylate, butyl acrylate, dodecyl acrylate, methyl methacrylate, ethylene glycol dimethacrylate or vinyl methacrylate, and also acrylonitrile and methacrylonitrile, and, in particular, allyl compounds, which can be in the form of ethers, esters, hydrocarbons and substituted aromatic or heterocyclic compounds, for example diallyl ether, vinyl allyl ether, allyl acetate, diallyl o-phthalate or m-phthalate, 3,3'-diallylbisphenol A, allyl isocyanurate or allyl cyanurate.

The proportion thereof can be up to 50% by weight, based on the amount of maleimide and acetoneanil. Preferably, a product from the reaction of acetoneanil with formaldehyde can also be present as the component (b).

Further preferred components (b) are aminophenols, in particular p-amino-p'-hydroxydiphenylmethane, which can also be substituted, preferably by an alkenyl group, such as the compound of the formula XIII Instead of the components (a) and (b), the mixture according to the invention can also contain a prepolymer thereof which is still fusible. This can be prepared by heating the starting materials, which have been homogeneously mixed and, if desired, finely ground, at 50°–150° C. for a time such that a partially soluble product which is still deformable by heat is formed. If appropriate, this prepolymer must again be ground to give a powder which can be processed. The prepolymerisation can also be effected by heating a solution or suspension of the starting materials. Suitable substances for this purpose are those which do not react with the starting materials and, if desired, dissolve the latter adequately. Examples of such liquids are the organic solvents already mentioned earlier in the text.

It is also possible to prepare the prepolymer by first adding one of the two reactants in an amount considerably less than equivalence and preparing an adequately soluble, still fusible prepolymer by heating the mixture thus prepared at 50° to 150° C. This product can then subsequently be finally cured by adding, in the final processing, the missing amount of the component which was originally present in a less than equivalent amount.

If the radicals $R_1$, $R_2$, $R_3$ and $R_4$ of the polymerisation catalyst defined by the formula II and used as components (c) of the mixture according to the invention are exclusively of an aromatic nature, the catalysts develop their polymerisation-initiating action even at relatively low temperatures. On the other hand, the partial incorporation of aliphatic radicals results in an increase in the starting temperature, as does the presence of an unsubstituted hydrogen atom. Preferred compounds are those in which $R_1=R_2$, $R_3=R_4$ and X and Y are hydroxyl. These compounds known as pinacones, better described as pinacols, are particularly readily accessible by reducing the corresponding ketones.

The most typical representative of these ethane derivatives is benzpinacol (1,2-dihydroxy-1,1,2,2-tetraphenylethane). The following may be mentioned as further examples of this class of substances: p,p'-dichlorobenzpinacol, p,p',p'',p'''-tetrachlorobenzpinacol, p,p'-dimethylbenzpinacol, p,p'-diphenylbenzpinacol, acetophenonepinacol, propiophenonepinacol, xanthonepinacol, 1,2-methoxytetraphenylethane, 1,2-dichlorotetraphenylethane and triphenylglycol.

If X or Y is a masked hydroxyl group, it can have been blocked by etherification, esterification or acetalisation.

The solubility of the catalysts in the bismaleimide resins can also be affected by the choice of substituents. The catalyst have a good latency; mixing with the bismaleimide resin can, therefore, be effected by stirring the catalyst into the warm resin, by adding it to the solution of laminating resin or by kneading it into the melted resin during the production of moulding materials.

The amount added is between 0.1 and 10% by weight, based on the amounts of the components (a), (b) and (c). It is advantageous to keep the amount of catalyst at the lower limit, since excess amounts can affect the properties of the finished polymer. Good results in respect of curing rate and properties of the finished components have been achieved by adding about 1% by weight in relation to the amount of resin.

The mixture according to the invention can contain further additives which are customary in the technology of curable plastics, such as fillers, plasticisers, pigments, dyes, mould release agents and flame-retardant substances. Examples of fillers which can be used are glass fibres, mica, graphite, quartz powder, kaolin, colloidal silicon dioxide or metal powders; examples of mould release agents which can be used are silicone oil, various waxes, zinc or calcium stearate and the like.

The mixtures can also contain solvents, for example chloroform, dioxane, tetrahydrofuran, dimethylformamide, tetramethylurea and N-methylpyrrolidone.

Depending on the end use or processing, it is also possible to add inhibitors, such as hydroquinone, phenothiazine or indole, to the mixtures according to the invention. The concentration of inhibitors in the reaction mixture is customarily between 0.1 and 5% by weight, based on the total amount of reacting components.

The curable mixtures according to the invention are used, in particular, in the fields of electrical engineering and laminating processes. They can be used in a formulation adapted in each case to suit the particular end use, in an unfilled or filled state, if desired in the form of solutions or dispersions, as dipping resins, casting resins, impregnating resins, binders, laminating resins, moulding materials and foam resins.

If the mixtures according to the invention are to be employed for coating surfaces or, in particular, for impregnating porous substances, it is advantageous to add a compound of the formula XIV

which contains a furyl group in its molecule.

The radical $R^o$ in this formula can, for instance, be as defined below:

| | | |
|---|---|---|
| (a) | $-CHO$ | |
| (b) | $-CH-Y_o$<br>$\quad\ \ \|$<br>$\quad\ OH$ | ($Y_o$ = H or an aromatic radical) |
| (c) | $-CH\begin{matrix}\diagup Y_1 \\ \diagdown Y_2\end{matrix}$ | ($Y_1$ and $Y_2$ are aromatic radicals) |
| (d) | $-CH_2OX_1$ | ($X_1$ is $-C_2H_5$, $-CH_2-CH\underset{O}{\underbrace{\quad\quad}}CH_2$,<br><br>$-CO.CH_3$, $-CO.CH=CH_2$,<br><br>$-CO.C=CH_2$, $-CO.CH=CH.CO-$,<br>$\quad\ \|$<br>$\quad CH_3$<br><br>$+CH_2-\underset{O}{\underbrace{\quad\quad}}-)_nH$). |
| (e) | $-CH\begin{matrix}\diagup OZ_1 \\ \diagdown OZ_2\end{matrix}$ | ($Z_1$ and $Z_2$ are aliphatic radicals). |

The compounds listed under (b) and (c) are predominantly substances which can be prepared by adding furfural onto phenols, in particular bisphenols or a dialkylbisphenol.

Examples of their use as impregnating solutions are the preparation of prepregs of all kinds, in particular chopped glass fibre prepregs for plastic moulding materials, or in the filament winding process.

Further information relating to this use of the mixture according to the invention is to be found in Swiss Patent Specification 619,251.

The invention also relates to a process for the preparation of cured polymers by heating a mixture according to the invention at a temperature of 50° to 300° C., preferably at a temperature between 80° and 250° C., depending on whether the polymerisation reaction is carried out in the melt or in solvents.

If the curing is carried out in the fused mass, temperatures of 100° to 250° C. are particularly suitable, it being advantageous to begin curing at temperatures below 180° C. In solution, on the other hand, lower temperatures of, for example, 50° to 150° C. can also be used.

The curing of the mixtures according to the invention is preferably effected in the melt or partially in the melt and partially in the solid phase, as a rule while simultaneously shaping to form mouldings, sheet-like structures, laminates, adhesive bonds or foams. Shaping is effected most simply by the casting process, using a hollow mould. However, it can also be effected by the compression moulding process by brief, rapid heating in a moulding press at, preferably, 170°–250° C. under a pressure of 0.1–20 mPa. The mouldings thus formed already have an adequate mechanical strength, so that they can be cured completely outside the moulding press in an oven at 200°–280° C.

If a prepolymer is first prepared from the curable mixtures, the former is ground to a fine powder and applied as a coating by the whirl-sintering process.

A solution or suspension of the prepolymer in a suitable solvent can be used for the production of laminates by impregnating porous sheet-like structures, such as fabrics, fibre mats or fibre nonwovens, particularly glass fibre mats or glass fibre fabrics, with solutions or suspensions, and removing the solvent by a drying process. Further curing is then effected by heating at 50° to 300° and, at least for a period, under pressure in a moulding press, preferably at 170°–250° C. and 0.1–20 mPa pressure. It is also possible only to pre-cure the laminates in the moulding press and to complete the curing of the products thus obtained in an oven at 200°–280° C. until optimum properties for use are achieved.

In spite of the polymerisation catalyst of the formula II it contains, the mixture according to the invention has the following properties:

Neither polymerisation nor copolymerisation is initiated at room temperature. An appreciable reaction does not begin until temperatures above 100° C. are reached, and increases rapidly as the temperature is raised.

By using these accelerators, the moulding temperature can be reduced by about 50° C. in the production of mouldings. At this moulding temperature it is possible to shorten the moulding cycle and thus to reduce the energy costs.

Although the curing of the maleimide resins is greatly accelerated by the addition of benzpinacols, the resins remain stable on storage at room temperature.

The benzipinacols added have a low sensitivity to other substances and to heat, and have a low toxicity.

Mixtures of bismaleimide with reactants containing an amine or phenolic OH grouping are polymerised with no falling off in the polymerisation rate. It is known that compounds of this type completely deactivate proven peroxides. In these special cases, for example adduct resins based on bismaleimide/diallylbisphenol A, bismaleimide/diaminodiphenylmethane and also bismaleimide together with novolak resins, benzpinacol is particularly suitable.

EXAMPLES 1 TO 4

The following mixtures are prepared from N,N'-4,4'-diaminodiphenylmethane-bis-maleimide (BMI) and 4 different reactants in each of two different ratios (a and b):

Example 1: with diaminodiphenylmethane (DDM);
Example 2: with a novolak formed from diallybisphenol A (DABA), phenol and paraformaldehyde in a ratio of 0.33:1.69:1.33, oxalic acid being used as the catalyst (novolak DABA+Ph);
Example 3: with diallybisphenol A (DABA);
Example 4: with bismaleimide-triazine "138 BT-3103" (made by Mitsubishi Gas, Japan), which is a mixture of bismaleimide with a triazine resin of the formula XII (BMI-triazine).

The total amount of the components is about 400 g in each example.

The amounts of reactants which can be seen in Table I are reacted as follows:

The reactants for BMI are first melted and heated to 140° C. in a sulfonation flask which is equipped with a stirrer, a thermometer, a reflux condenser and an inlet nozzle, and which stands in an oil bath heating at 150° C. BMI is added in portions at this temperature. When the addition is complete, the resin is subjected to further condensation, until the viscosity increases noticeably and cooled drops of resin become brittle and grindable. When this point in time has been reached, the resin is cooled very quickly to 110°–120° C. and the prescribed amount of benzpinacol is stirred in. The resin is then poured out onto a melt foil in order to cool. For comparison, resins without added catalyst are prepared by stopping the reaction at the same viscosity and pouring the mass out onto a metal foil.

For all the further tests, the resins are ground and screened through a sieve having a mesh of inner width 0.5 mm. The binders thus prepared are the starting materials for the differential thermo-analysis (DTA) measurements and for the preparation of the moulding materials.

The reaction times indicated in Table I for the preparation of the adduct resins exhibit differences which are due to the reactivity of the various reactants with BMI. The reaction must be carried out very rapidly when preparing the DDM adduct resins; equipment operating continuously is suitable for this purpose.

As shown in the table, the softening ranges are also greatly dependent on the reactant selected for the BMI.

Preparation of the moulding materials

The moulding materials are prepared by the dry mixing process, i.e. all the components are put into a ball mill and ground until they have reached the necessary fineness required to produce satisfactory mouldings. For all the 4 examples, 150 g of binder, 350 g of amorphous quartz as a filler, 2.5 g of OP wax as a release agent and 1 g of carbon black as a pigmenting agent are put into a porcelain ball mill, half filled with porcelain balls. The ball mill is closed and the mixture is ball-milled until samples taken show no further difference in surface condition and depth of colour after compression moulding.

Preparation of the test specimens (compression moulding)

In order to prepare test specimens using the pulverulent moulding material, a tablet is first prepared at room temperature under a pressure of 25 Pa. This tablet is kept in a high-frequency field until it has a temperature of 80°–90° C.

The preheated tablet is put immediately into the compression mould, which has been heated to 200° C., and is compression moulded to give a test rod under a pressure of 6 mPa. The test specimens are produced at a mould temperature of 200° C. and a dwell time in the mould of 1 minute/mm of wall thickness of the moulding. A curing time of 4 minutes is required for a VSM* rod (120×10×4 mm).
*VSM=Verein Schweizerischer Maschinenindustrieller ("Association of Swiss Machinery Manufacturers")

After-treatment applied to the test specimens

The test specimens are post-cured for 22 hours at 220° C. in order to achieve optimum properties.

Table II shows certain physical properties of the test specimens prepared in this way.

DTA measurements

The DTA diagrams are recorded on a Mettler "TA 2000" apparatus.

TABLE I

| Components | Example 1 1a | Example 1 1b | Example 2 2a | Example 2 2b | Example 3 3a | Example 3 3b | Example 4 4a | Example 4 4b |
|---|---|---|---|---|---|---|---|---|
| BMI, % | 84.8 | 79.2 | 79.2 | 66.0 | 79.2 | 66.0 | 74.2 | 66.0 |
| DDM, % | 14.2 | 19.8 | | | | | | |
| Novolak DABA + Ph, % | | | 19.8 | 33.0 | | | | |
| DABA, % | | | | | 19.8 | 33.0 | | |
| BMI—triazine | | | | | | | 24.8 | 33.0 |
| Benzpinacol, % | 1.0 | 1.0 | 1.0 | 1.0 | 1.0 | 1.0 | 1.0 | 1.0 |
| Reaction time required for the preparation of the binder, minutes | 13 | 15 | 55 | 86 | 70 | 85 | 62 | 80 |
| Melting range of the binder, °C. | 105–110 | 110–115 | 85–90 | 95–100 | 75–85 | 85–90 | 100–110 | 110–115 |
| Comparative tests | | | | | | | | |
| BMI, % | 85.7 | 80.0 | 80.0 | 66.7 | 80.0 | 66.7 | 75.0 | 69.3 |
| DDM, % | 14.3 | 20.0 | | | | | | |
| Novolak DBA + Ph, % | | | 20.0 | 33.3 | | | | |
| DABA, % | | | | | 20.0 | 33.3 | | |
| BMI—triazine, % | | | | | | | 25.0 | 20.7 |

TABLE II

| Properties | Example 1 1a | Example 1 1b | Example 2 2a | Example 2 2b | Example 3 3a | Example 3 3b | Example 4 4a | Example 4 4b |
|---|---|---|---|---|---|---|---|---|
| Shrinkage in the mould | 0.08 | 0.08 | 0.45 | 0.20 | 0.33 | 0.50 | 0.30 | 0.40 |
| After-shrinkage (+), % | 0.08 | 0.16 | 0.20 | 0.30 | 0.25 | 0.16 | 0.25 | 0.40 |
| Loss in weight after 21 hrs. at 220° C. % | 0.01 | 0.05 | 0.06 | 0.01 | 0.01 | 0.04 | 0.10 | 0.14 |
| Flexural strength, N/mm$^2$ VSM 77,103 | 59.2 | 55.7 | 76.0 | 67.8 | 72.3 | 83.0 | 56.0 | 54.2 |
| Flexural strength after curing, N/mm$^2$ VSM 77,103 | 68.4 | 66.2 | 134.7 | 90.8 | 95.5 | 120.2 | 105.7 | 84.2 |
| Deflection at break, mm | 0.4 | 0.5 | 0.9 | 0.5 | 0.7 | 0.8 | 0.7 | 0.6 |
| Impact strength, kj/m$^2$ VSM 77,105 | 1.3 | 1.3 | 1.4 | 1.3 | 1.5 | 1.6 | 1.2 | 1.5 |
| Impact strength after curing, kj/m$^2$ VSM 77,105 | 1.5 | 1.5 | 3.6 | 3.6 | 2.3 | 3.3 | 3.4 | 2.4 |
| Heat distortion point, °C. ISO 75 | 250 | 250 | 181 | 250 | 250 | 191 | 240 | 250 |
| Heat distortion point after curing, °C. ISO 75 | 250 | 250 | 250 | 250 | 250 | 250 | 250 | 250 |
| Flexural modulus of elasticity, N/mm$^2$ VSM 77,103, after curing | 14563 | 14610 | 14845 | 15080 | 13900 | 13576 | 14329 | 12021 |
| Coefficient of linear thermal expansion VDE* 0304, 10$^{-5}$/degree | 14.3 | 14.8 | 13.4 | 14.2 | 12.8 | 13.2 | 13.2 | 14.7 |

*Verein Deutscher Elektroingenieure (Association of German Electrical Engineers)

The DTA measurement is the best possible means of demonstrating the effect of the novel accelerators on BMI resins. Evaluation of the DTA diagrams shows that:
- the curing of all the selected adduct resins takes place exothermically;
- the evolution of heat during curing takes place at a lower temperature in the case of the mixtures containing the catalyst than in the case of those containing no catalyst, although the resins differ greatly from one another in their chemical structures (—NH$_2$, phenolic OH groups or triazine), and the temperature is lowered by 30°–60° C., depending on the composition.

Compression moulding equipment is only economically efficient if there is a large number of pieces to be moulded; this also means that rapid-curing binders are necessary. Moulding materials containing no polymerisation catalyst cannot be processed within a time which is justifiable on economic grounds.

The moulding materials described in Examples 1 to 4 can be cured rapidly and, at the same time, are stable on storage at room temperature. Even when the resins used are chemically very different from one another, the mouldings can be removed from the mould after a moulding time of 1 minute per mm of wall thickness at 200° C. After-curing is advantageous in order to achieve optimum properties.

What is claimed is:

1. A heat-curable mixture, stable on storage and based on a polyimide and a polymerization catalyst, which comprises (a) a polymaleimide of the formula I

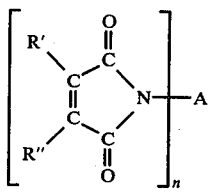

in which

R' and R" are a hydrogen atom or a linear or branched alkyl group having 1 to 4 C atoms and A is a divalent, trivalent or tetravalent aliphatic radical having 2 to 30 C atoms, a cycloaliphatic radical, an aromatic radical, a heterocyclic radical or an araliphatic radical and n is 2, 3 or 4, or, when n is 2, A is also a direct bond, (b) a compound having at least two functional groups of the same or different type and having at least one olefinic double bond in the molecule, which compound undergoes an addition or polymerization reaction with the maleic double bond, or a still fusible prepolymer of such a component with (a), and (c) in an amount of 0.1 to 10% by weight, based on the sum of the amounts of (a), (b) and (c), of a polymerization catalyst of the formula II

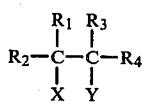

in which $R_1$ and $R_3$ are each an aromatic radical, $R_2$ is a hydrogen atom or an aliphatic or aromatic radical, $R_4$ is an aliphatic or aromatic radical and X and Y, independently of one another, are each a free or masked hydroxyl group or a halogen atom.

2. A mixture according to claim 1, wherein (a) is a maleimide of the formula I in which A is an unsubstituted or methyl-substituted phenylene or biphenylene group, a diphenyl ether group, a diphenyl sulfone group, a 2,2-diphenylpropane group or a diphenylmethane group and n is 2.

3. A mixture according to claim 1 which comprises
(a) 4,4'-bis(maleimidophenyl)methane,
(b) a novolak formed from diallylbisphenol A, phenol and paraformaldehyde in a ratio of 0.33:1.69:1.33, and
(c) 1,1,2,2-tetraphenyl-1,2-ethanediol.

4. A mixture according to claim 1 which comprises
(a) 4,4'-bis(maleimidophenyl)methane,
(b) 2,2-bis(4-hydroxy-3-allylphenyl)propane, and
(c) 1,1,2,2-tetraphenyl-1,2-ethanediol.

5. A mixture according to claim 1, wherein (b) is a vinyl or allyl compound.

6. A mixture according to claim 5, wherein (b) is an alkenylphenol of the formula III

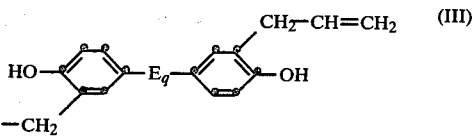

in which E is one of the radicals —CH$_2$—,

—SO$_2$—, —SO—, —S— or —O— and q is 0 or 1.

7. A mixture according to claim 1, wherein (b) is a triallyl cyanurate or triallyl isocyanurate.

8. A mixture according to claim 1, wherein (b) is a phenol of the formula IV

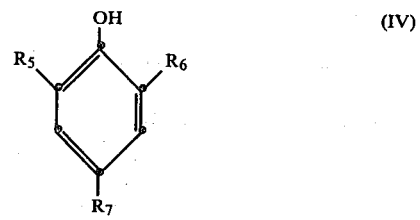

in which $R_5$, $R_6$ and $R_7$ are each a hydrogen atom or an allyl or propenyl group, at least one of the substituents $R_5$ to $R_7$ being the propen-1-yl group.

9. A mixture according to claim 1, wherein (b) is a compound of the formula

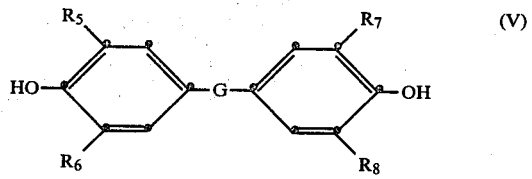

in which $R_5$, $R_6$, $R_7$ and $R_8$ are each a hydrogen atom or an allyl or propenyl group, at least one of the substituents $R_5$ to $R_8$ being the propen-1-yl group, and G is isopropylene, methylene, sulfonyl, —O— or —S—.

10. A mixture according to claim 1, wherein (b) is a compound of the formula VI

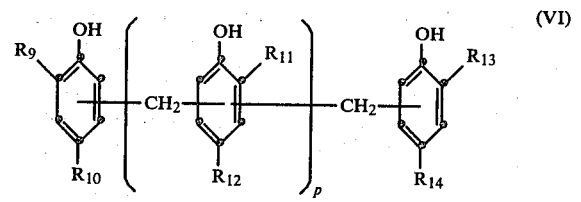

in which $R_9$, $R_{10}$, $R_{11}$, $R_{12}$, $R_{13}$ and $R_{14}$ are each a hydrogen atom, alkyl having 1 to 4 C atoms, allyl or propenyl, at least one of the substituents $R_9$ to $R_{14}$ being the propen-1-yl group, and p is a number from 0 to 10.

11. A mixture according to claim 1, wherein (b) is a glycidyl ether of the formula VII

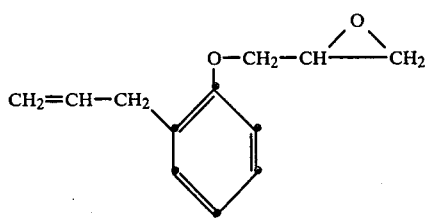

(VII)

12. A mixture according to claim 1, wherein (b) is a glycidyl ether of novolaks containing at least one allyl group on at least one aromatic nucleus.

13. A mixture according to claim 1, wherein (b) is a polyepoxy adduct which has been prepared by an advancement reaction of one or more diepoxide compounds with one or more bisphenols, at least one reactant having one or more allyl groups on at least one aromatic nucleus.

14. A mixture according to claim 1, wherein (b) is an epoxide compound which has been prepared by reacting, with epichlorohydrin in alkaline solution, bisphenols containing one or more allyl groups on at least one aromatic nucleus.

15. A mixture according to claim 1, wherein (b) is a compound of the formula XIII

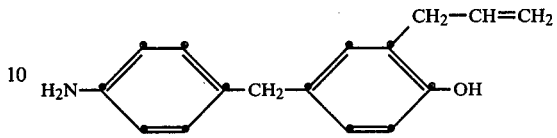

(XIII)

16. A mixture according to claim 1, wherein (b) is 2,2,4-trimethyl-1-dihydroquinoline (acetoneanil) in an amount such that there is 0.05 to 1 mol of acetoneanil to 1 equivalent of imide group.

17. A mixture according to claim 1, wherein (b) is a product from the reaction of 2,2,4-trimethyl-1-dihydroquinoline with formaldehyde.

18. A mixture according to claim 1, wherein (c) is 1,2-dihydroxy-1,1,2,2-tetraphenylethane (benzpinacol).

* * * * *